United States Patent
Abohammdan et al.

(10) Patent No.: US 10,330,252 B2
(45) Date of Patent: Jun. 25, 2019

(54) HANGER FOR MOUNTING TO AN UPSTANDING POST

(71) Applicant: Walmart Apollo, LLC, Bentonville, AR (US)

(72) Inventors: Tawfeek J. Abohammdan, Bentonville, AR (US); Timothy R. Hodges, Bentonville, AR (US); Paul E. Durkee, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/642,436

(22) Filed: Jul. 6, 2017

(65) Prior Publication Data

US 2018/0010734 A1 Jan. 11, 2018

Related U.S. Application Data

(60) Provisional application No. 62/359,753, filed on Jul. 8, 2016.

(51) Int. Cl.
| | | |
|---|---|---|
| *F16B 45/00* | (2006.01) | |
| *F16M 13/02* | (2006.01) | |
| *B65D 19/38* | (2006.01) | |
| *B25H 3/04* | (2006.01) | |

(52) U.S. Cl.
CPC .............. *F16M 13/02* (2013.01); *B25H 3/04* (2013.01); *B65D 19/38* (2013.01); *B65D 2519/00791* (2013.01); *F16B 45/00* (2013.01)

(58) Field of Classification Search
CPC .................. F16M 13/02; B65D 19/38; B65D 2519/00791; F16B 45/00; A47G 1/16; A47G 29/083; A47F 5/0006; A47F 5/0823; A47F 5/0869; A47B 57/42; G09F 3/204

USPC ..... 248/218.4, 220.21, 219.4, 219.1, 220.22, 248/220.41, 220.42, 220.43, 223.21, 248/225.11, 225.21, 224.7, 250, 304, 305,
(Continued)

(56) References Cited

U.S. PATENT DOCUMENTS

| 1,503,083 | A | * | 7/1924 | Amey | ...................... B60R 9/02 224/42.39 |
|---|---|---|---|---|---|
| 2,259,663 | A | | 10/1941 | Rosenthal | |
| 2,430,624 | A | | 11/1947 | Vollmer | |

(Continued)

FOREIGN PATENT DOCUMENTS

| CA | 19022 | 4/1953 |
|---|---|---|
| CA | 491935 | 4/1953 |

OTHER PUBLICATIONS

"Besi Sangkut Baju"; Lelong.com; https://www.lelong.com.my/besi-sangkut-baju-misssweetie2010-156868351-2015-01-Sale-P.htm; publication available prior to Jul. 8, 2016; pp. 1-3.

(Continued)

*Primary Examiner* — Nkeisha Smith
(74) *Attorney, Agent, or Firm* — Fitch, Even, Tabin & Flannery LLP (57) ABSTRACT

In some embodiments, apparatuses and methods are provided herein useful for stable hanging of objects with relatively wide hanging surfaces. In some embodiments, hangers are described herein with a platform hanging portion that provides a user with a wide hanging surface that can be used to support the relatively wide hanging surfaces. The platform portion can further restrict movement of the object, such as laterally and/or forwardly/rearwardly.

4 Claims, 6 Drawing Sheets

(58) Field of Classification Search
USPC ..... 248/309.1, 316.1, 339, 317, 316.8, 37.3, 248/226.11, 176.1, 213.2; 211/41.1
See application file for complete search history.

(56) References Cited

U.S. PATENT DOCUMENTS

| | | | | |
|---|---|---|---|---|
| 2,500,881 | A * | 3/1950 | Stader | A47G 25/08 211/100 |
| 2,644,591 | A * | 7/1953 | McMahan | A47F 5/103 211/187 |
| 3,070,339 | A * | 12/1962 | Schayer | A47F 5/0823 211/106 |
| 3,693,923 | A * | 9/1972 | Ayoub | A47K 5/04 211/73 |
| 3,853,293 | A * | 12/1974 | Larson | A47F 5/0823 211/86.01 |
| 3,977,801 | A * | 8/1976 | Murphy | E04B 1/2403 248/188 |
| 3,985,324 | A * | 10/1976 | Larson | A47F 5/0823 211/70.6 |
| 4,062,137 | A * | 12/1977 | Herzog | A47F 5/0823 211/59.1 |
| 4,093,168 | A * | 6/1978 | Buril | A47F 5/0807 211/57.1 |
| 4,162,015 | A * | 7/1979 | Hodges | A47F 5/0823 211/125 |
| 4,852,845 | A * | 8/1989 | Lener | A45C 13/03 206/291 |
| 4,858,870 | A | 8/1989 | Mazzanti | |
| 5,104,083 | A * | 4/1992 | Shannon | B60R 7/10 211/105.1 |
| 5,944,178 | A * | 8/1999 | Mao | A45C 13/03 206/289 |
| 8,091,845 | B2 * | 1/2012 | Di Lollo | A47J 47/16 211/41.1 |
| 8,186,635 | B2 * | 5/2012 | DeVito | A47F 5/0823 248/220.21 |
| 8,245,992 | B2 * | 8/2012 | Matsui | F16M 13/02 248/224.51 |
| 8,474,770 | B2 * | 7/2013 | Reo | A47K 3/003 248/224.7 |
| 9,341,285 | B2 * | 5/2016 | Magno, Jr. | H02G 3/32 |
| 9,345,343 | B2 * | 5/2016 | Sobb | A47F 5/0823 |
| 2002/0088912 | A1 * | 7/2002 | Yu | A47F 7/04 248/304 |
| 2015/0284961 | A1 * | 10/2015 | Iannelli | E04D 13/0725 248/48.2 |

OTHER PUBLICATIONS

"Groove plate five ball hook square seven bead clothing store clothing accessories shelf hook hanging on a wall hook"; Aliexpress.com; http://www.aliexpress.com/store/product/Groove-plate-five-ball-hook-square-seven-bead-clothing-store-clothing-accessories-shelf-hook-hanging-on/1462656_32271608097.html; publication available prior to Jul. 8, 2016; pp. 1-8.

"Hang N' Hide—Laundry Holder"; Howards Storage World; publication available prior to Jul. 8, 2016; p. 1.

"Wall-Mount Hanger Holder"; The Container Store; publication available prior to Jul. 8, 2016; pp. 1-3.

* cited by examiner

FIG. 6

HANGER FOR MOUNTING TO AN UPSTANDING POST

CROSS-REFERENCE TO RELATED APPLICATIONS

This application claims the benefit of U.S. 62/359,753, filed Jul. 8, 2016, which is hereby incorporated by reference herein in its entirety.

TECHNICAL FIELD

This invention relates generally to hangers and, more particularly, to hangers for objects with wide openings.

BACKGROUND

Pallets and other objects can be frequently moved within storage areas. One form of conveyance uses a cart with a detachable handle. The detachable handle allows the pallets to be closely stored together, but requires that the handles be stored somewhere. By one approach, the handles can be leaned against a wall or placed on a shelf; however, this can lead to the handles being misplaced or damaged as a result of being knocked over. By another approach, the handles can be hung on the wall using J-hooks. The relatively wide opening of the handles, however, can cause the handle to be rest unstably on hook. This can cause the handle to fall to a corner thereof, swing, and so forth, which could cause injury or damage the handle. Additionally, often convenient locations to hang the handles are only several inches wide, and can be made of metal, making multiple J-hooks impractical.

BRIEF DESCRIPTION OF THE DRAWINGS

Disclosed herein are embodiments of systems, apparatuses and methods pertaining to hanging objects and, more particularly, to hanging objects with relatively wide openings. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for stable hanging of objects, such as dolly handles, with relatively wide, generally flat hanging surfaces. By one approach, relatively wide can refer to any hanging surface, e.g., an opening or horizontal portion of the object, that is larger than 2 inches. By another approach, relatively wide can refer to any hanging surface larger than 5 inches. In some embodiments, hangers are described herein with a platform hanging portion that provides a user with a wide hanging surface that can be used to support the relatively wide hanging surfaces. The platform portion can further restrict movement of the object, such as laterally and/or forwardly/rearwardly.

A hanger 10 providing these advantages is shown in FIGS. 1-6. The hanger 10 includes an anchor portion 12 and a hanging portion 14. The anchor portion 12 can be elongate and configured to extend along and abut a hanging surface 16. The hanging portion 14 extends from the anchor portion 12 at one of the ends 18 thereof. The hanging portion 14 joins to the anchor portion 12 at a first end 20 thereof and extends to a distal, second end 22. If desired, the hanging portion 14 can include a retention member 24 at the distal end 22 thereof, such as an upwardly projecting hook or wall as shown. The retention member 24 is configured to retain hanging objects 28 on the hanging portion 14 when the objects 28 are jostled.

As shown in FIGS. 1-5, the hanging portion 14 further includes a platform portion 26 that is configured to receive hanging surfaces 30 of the objects 28 thereon. The hanging portion 14 includes lateral projections 34 that extend laterally outwardly from adjacent portions 36 of the hanging portion 14 to provide a wide hanging surface 38. By one approach, a lateral width of the platform portion 26 can be twice as wide as the adjacent portions 36 and/or the anchor portion 12. By other approaches, the lateral width of the platform portion 26 can be three, four, or five times as wide as the adjacent portions 36 and/or the anchor portion 12.

The platform portion 26 can be configured to restrict movement of the hanging objects 28 in addition to the lateral width of the platform portion 26. In some embodiments, the hanging surface 38 can be of a high friction material or include portions of a high friction material, such as rubber, texturized surface patterns, foam, adhesive, and so forth. So configured, the friction of the hanging surface 38 will act to minimize lateral movement of the objects 28, even if the objects 28 have a wider hanging surface 30 than the lateral width of the platform portion 26.

In several embodiments, the hanging surface 38 can include one or more laterally-extending depressions 40 configured to receive a portion of the objects 28 during hanging. The laterally-extending depressions 40 act to minimize forward/rearward movement of the objects 28 and act to separate the objects 28, which provides easier access and minimizes damage from the objects 28 hitting each other. By one approach, the platform portion 26 can include up to six depressions 40 extending laterally thereacross such that the hanging portion 14 can receive six objects 28 thereon. By other approaches, the platform portion 26 can be sized to receive as many objects 28 thereon as desired. In the illustrated form, the depressions 40 have a curved, undulating configuration.

Figure 1:
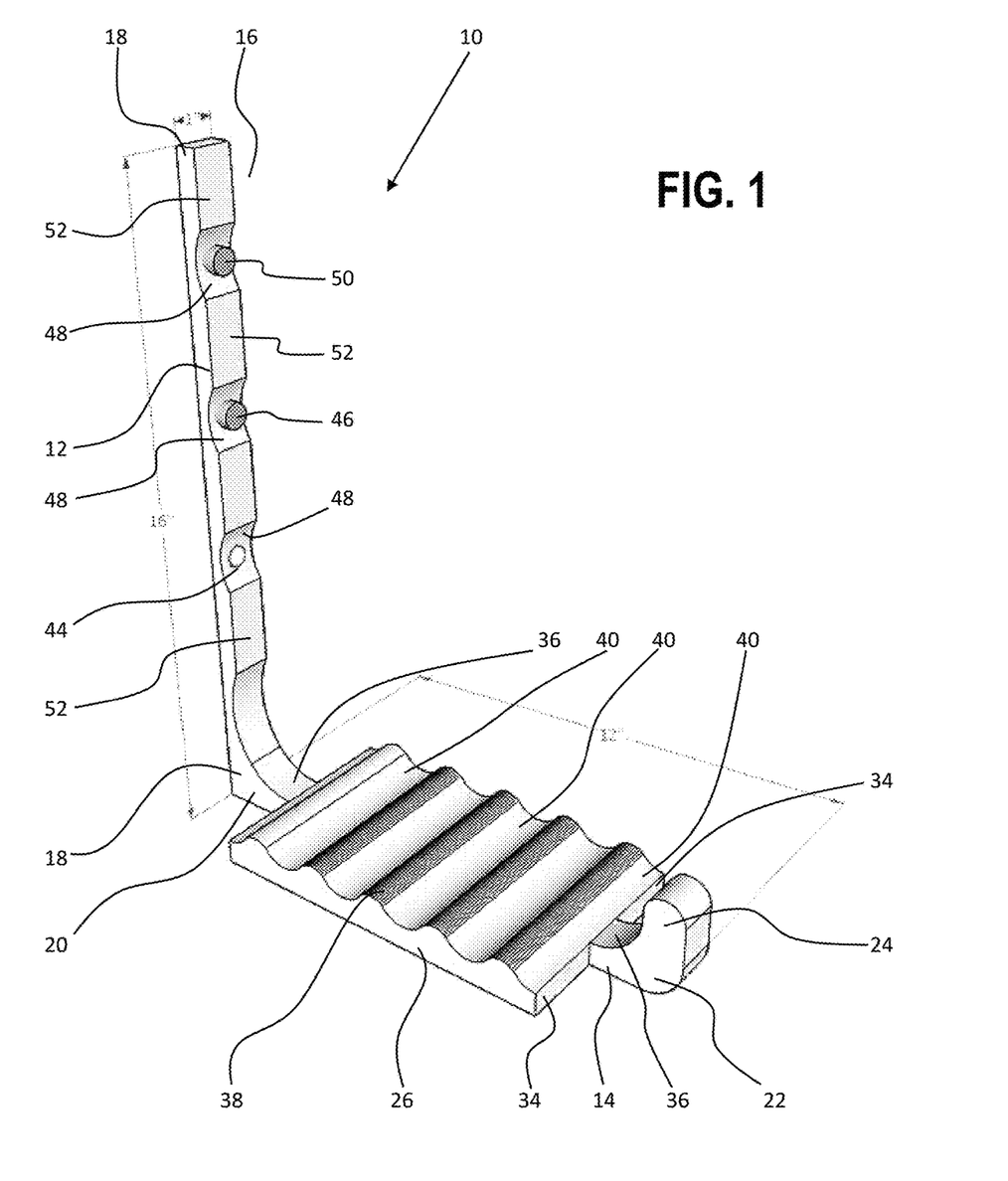
FIG. 1 is a perspective view of a first embodiment of a hanger in accordance with some embodiments.
Figure 2:
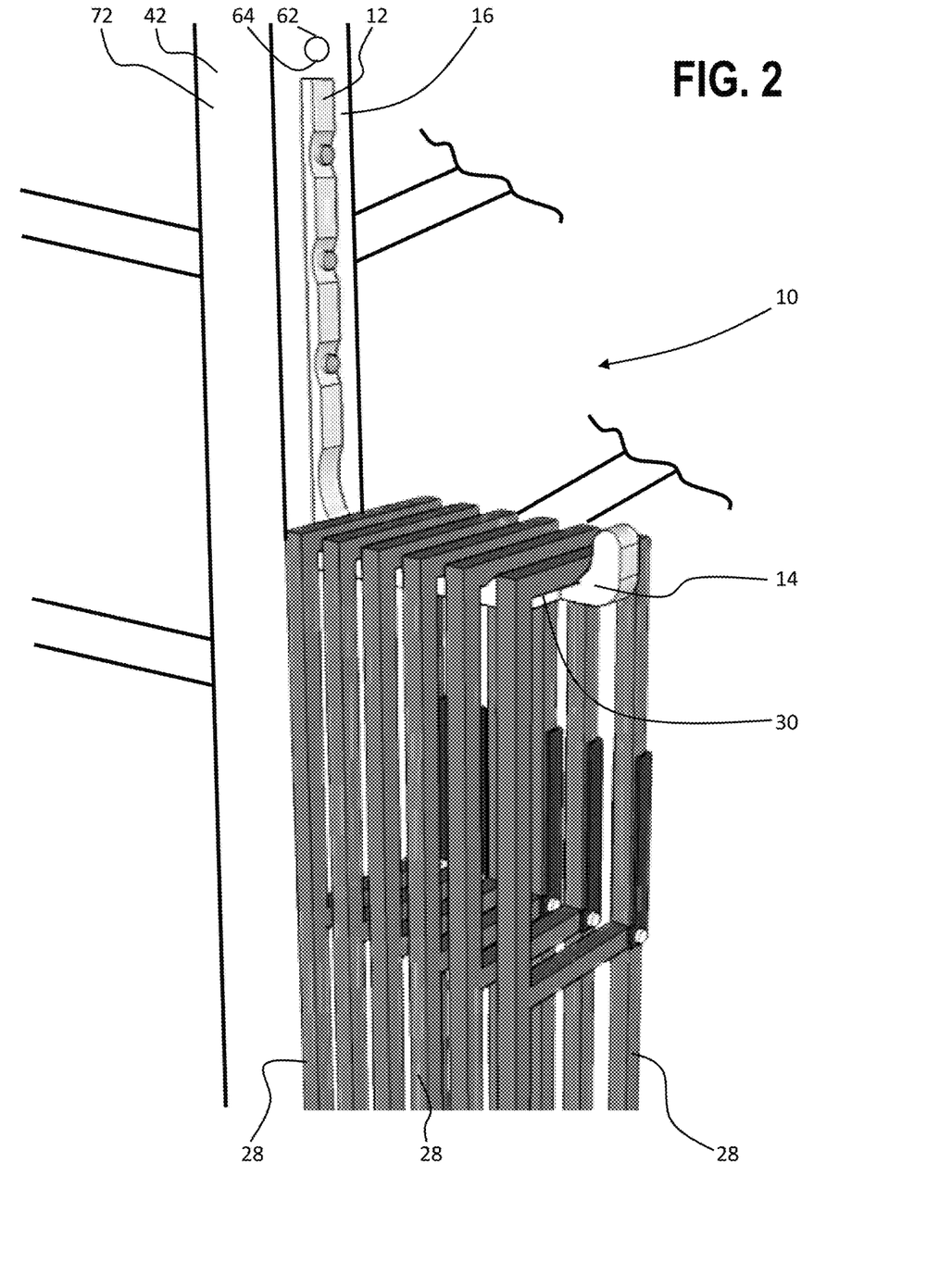
FIG. 2 is a perspective view of the hanger of FIG. 1 showing objects hung thereon in accordance with several embodiments.
Figure 3:
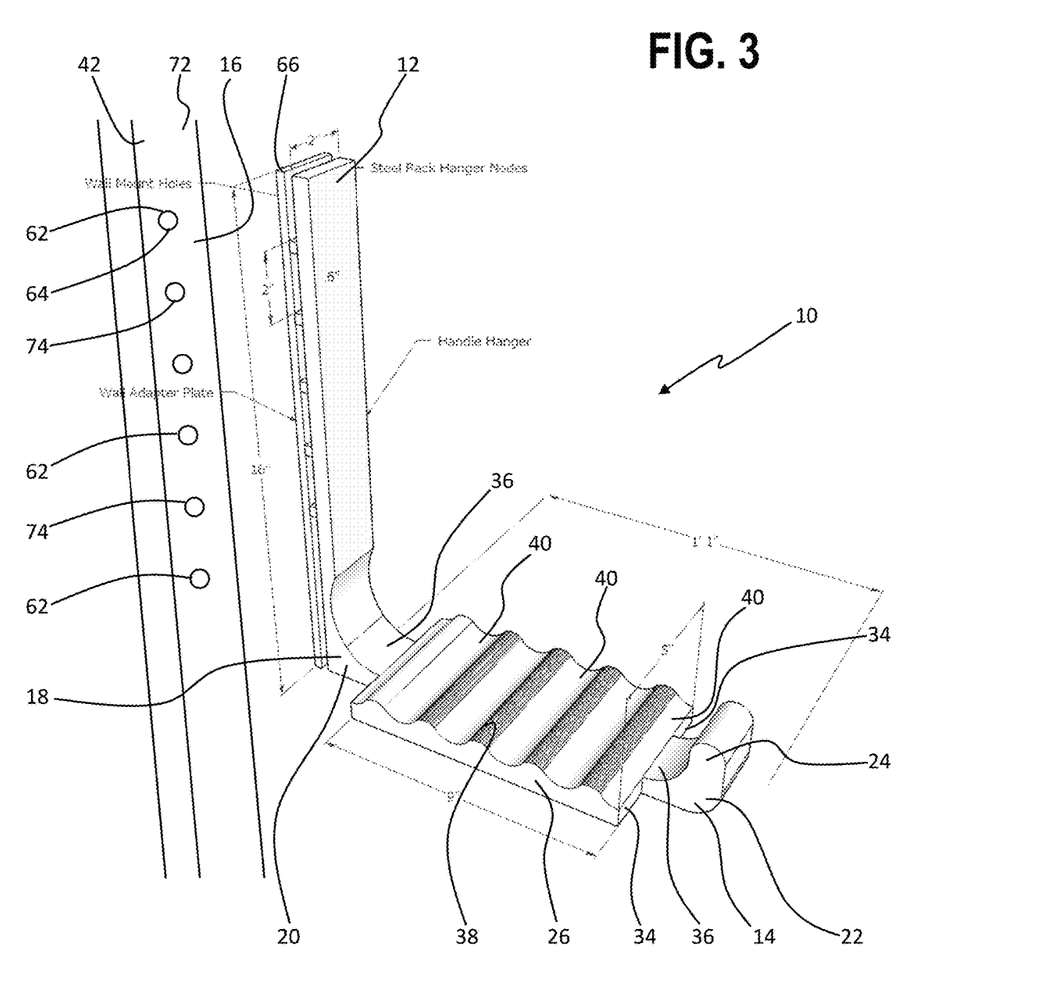
FIG. 3 is a perspective view of a second embodiment of a hanger in accordance with some embodiments.

The anchor portion 12 is configured to be mounted to the hanging surface 16 of an upstanding wall and/or post 42. By one approach, the anchor portion 12 can include one or more openings 44 extending therethrough configured to receive fasteners 46, such as screws, bolts, and the like, therethrough to secure the anchor portion 12 to the post 42. If desired, the anchor portion 12 can include recesses 48 extending around the openings 44 so that a head 50 of the fasteners 46 can be disposed within the recess 48 and be generally flush with or recessed with respect to adjacent portions 52 of the anchor portion 12. In the illustrated form, the anchor portion includes three spaced openings 44.

Figure 4:
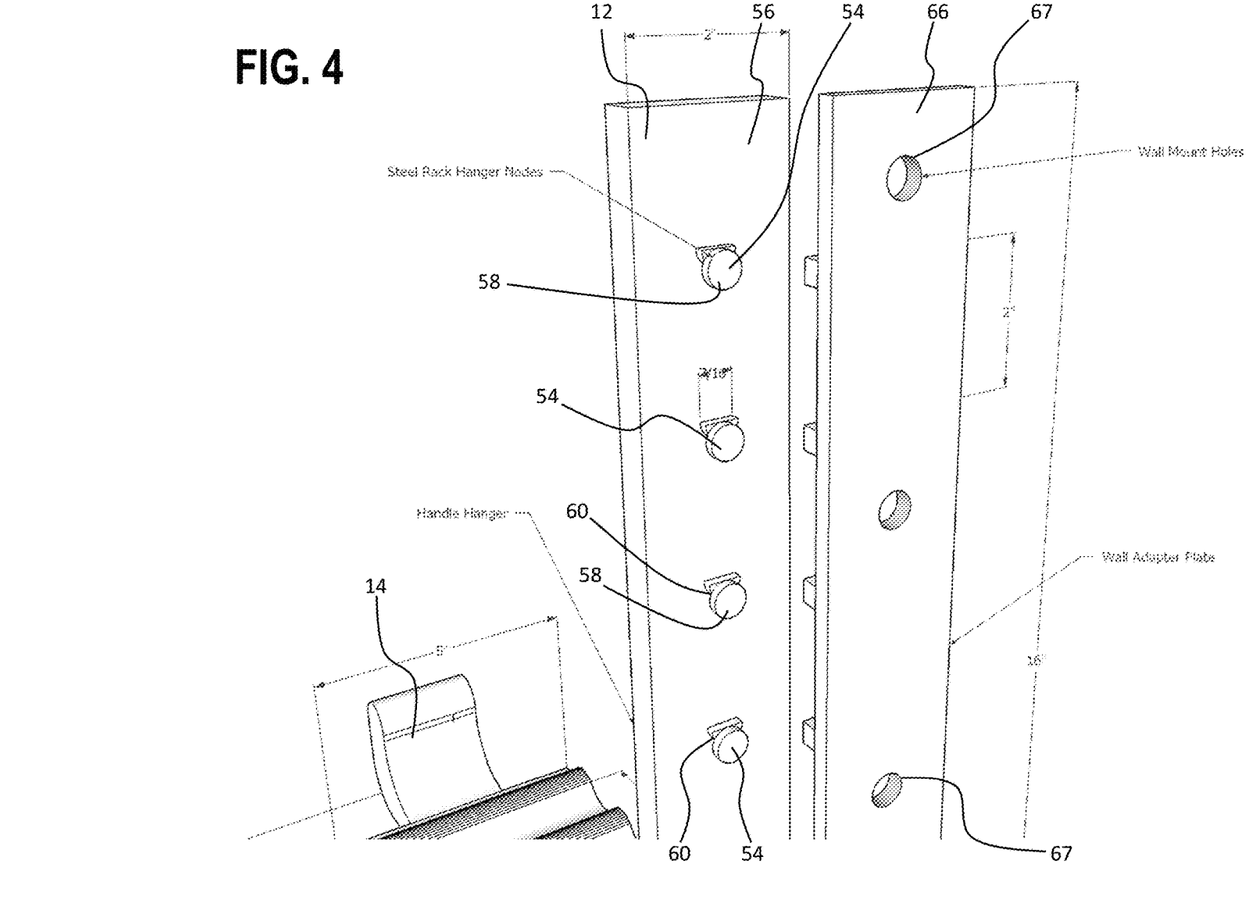
FIG. 4 is a sectional perspective view of the hanger of FIG. 3 showing rearward projecting protrusions for hanging in accordance with several embodiments.
Figure 5:
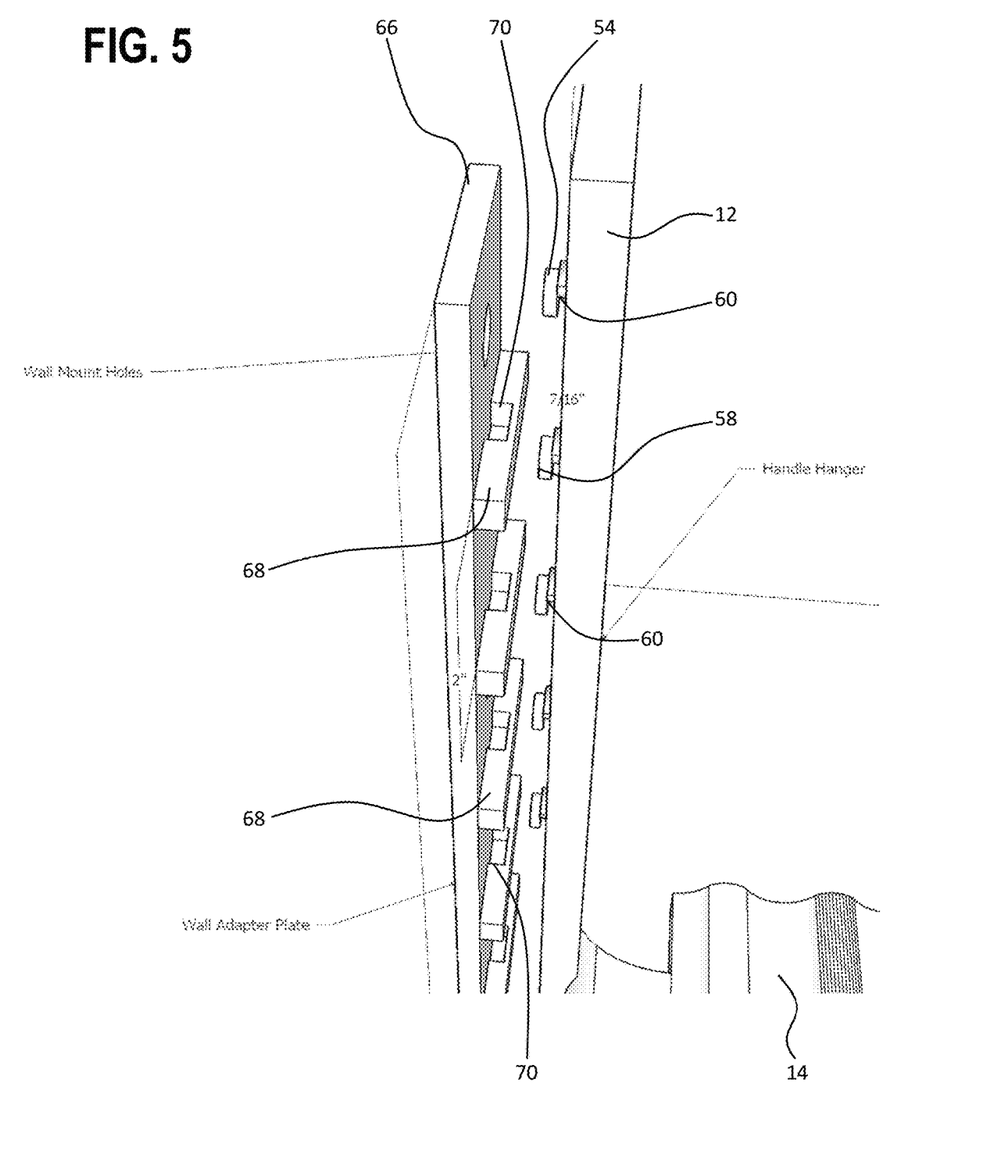
FIG. 5 is a sectional perspective view of the hanger of FIG. 3 showing a bracket having ledges thereon for reception of the protrusions shown in FIG. 4 in accordance with some embodiments.

By another approach as shown in FIGS. 3-5, the anchor portion 12 can include rearwardly projecting protrusions 54 that extend from a rear surface 56 thereof. The protrusions 54 can include a rear panel portion 58 and a downwardly facing recess or slot 60 disposed between the panel portion 58 and the rear surface 56. By a preferred approach, the panel portion 58 can be circular to fit within a circular opening. So configured the protrusions 54 can be inserted into openings 62 in the wall or post 42 and slid slightly downwardly so that an edge 64 of the opening 62 is inserted into the slot 60 and the anchor portion 12 is secured to the wall 42. By further approaches, the hanger 10 can include a mounting bracket 66 that can be mounted to the wall or post 42 with fasteners or the like through openings 67 as discussed above. More specifically, in one form, the bracket 66 can include ledges 68 with a recess 70 therein sized to receive the panel portion 58 therein. So configured, a user can mount the bracket 66 to the wall or post 42 at a desired location, and the hanger 10 can be mounted to the bracket 66 with the protrusions 54.

In one particularly advantageous configuration, the hanger 10 can be mounted to a narrow-width post 72, such as between about 2 inches to about 4 inches wide. In several embodiments, the post 72 can be made of a high gauge metal for shelving and the like and, as such, can be difficult to mount objects thereto. Further, the post 72 can include openings 74 therein that can advantageously be utilized to mount the hanger 10 thereto. The hanger 10 described herein is particularly useful because the platform portion 26 can provide a wider hanging surface 38 than a width of the post 72. For example, the width of the hanging surface 38 can be more than double the width of the post 72, such as two and a half times larger. As such, the hanger 10 provides a wide-hanging surface functionality with a narrow-width anchor, i.e., one vertical line of securing points.

By some approaches, the objects 28 can have a weight of about 10-15 pounds, such that the hanging portion 14 is configured to have about 100 pounds hung thereon. In the form illustrated in FIG. 1, the anchor portion 12 can be about 1 inch wide and about 16 inches tall; the hanging portion 14 can be about 12 inches deep, the platform portion 26 is about 5 inches wide and the adjacent portions 36 are about 1 inch wide. In the form illustrated in FIG. 3, the anchor portion 12 can be about 2 inches wide and about 16 inches tall; the hanging portion 14 is about 13 inches deep, the platform portion 26 is about 5 inches wide, and the adjacent portions 36 are about 2 inches wide. Further, the bracket 66 can be about 2 inches wide and about 16 inches tall. The rearwardly projecting protrusions 54 and the ledges 68 can be spaced apart along the height of the anchor portion 12 and the bracket 66 by about 2 inches.

In some embodiments, a hanger configured to be mounted to an upstanding post is described herein that includes an elongate anchor portion configured to extend vertically along and be secured to the upstanding post, a support portion extending generally outwardly and transverse from the anchor portion at a first end thereof to a distal end thereof, and a hanging platform portion of the support portion extending laterally outwardly from adjacent portions of the support portion such that a width of the hanging platform portion is larger than a width of the upstanding post, the hanging platform portion configured to receive objects thereon for hanging.

By several approaches, the hanging platform portion can include an upper surface having one or more laterally extending depressions therein configured to restrict movement of objects hung on the hanging platform portion.

By some approaches, the elongate anchor portion can include one or more openings extending therethrough configured to receive fasteners to secure the anchor to the upstanding post. By other approaches, the anchor portion can include rearwardly projecting protrusions configured to be received within openings or recesses to secure the anchor to the upstanding post, such as utilizing a bracket configured to mount to the upstanding post.

By several approaches, the width of the hanging platform portion can be at least two times larger than the width of the upstanding post. By some approaches, the width of the hanging platform portion can be at least two times larger than a width of the anchor portion. By several approaches, the hanging platform portion can have a lateral width about half the size of a length of the support portion between the first end and distal end thereof.

Figure 6:
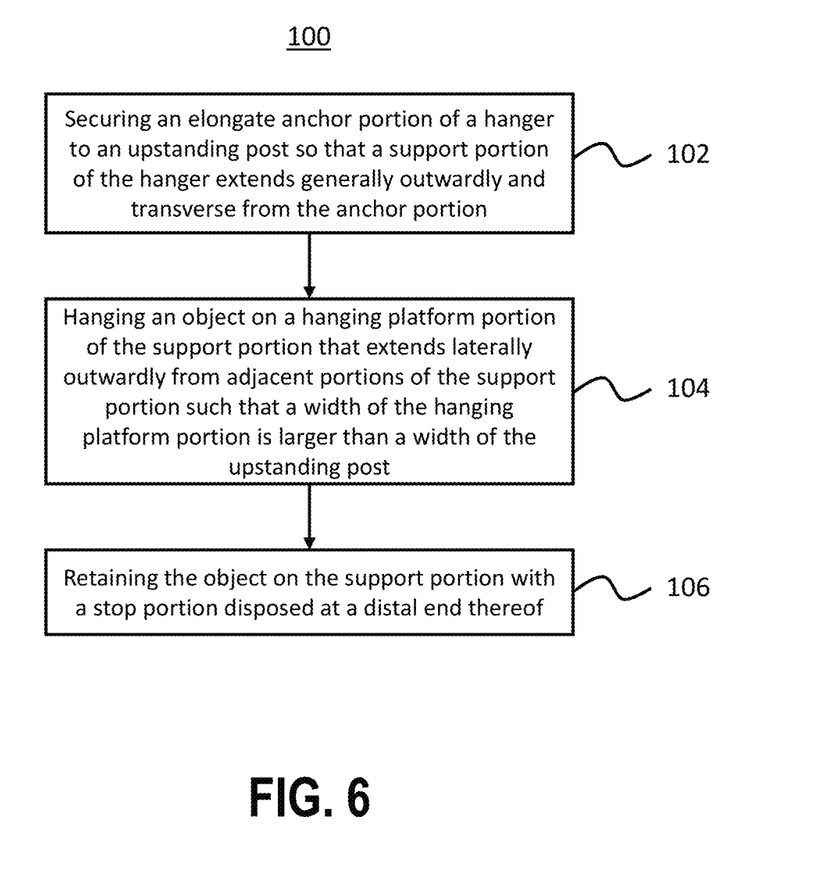
FIG. 6 is a flowchart in accordance with several embodiments.

In several embodiments and shown in FIG. 6, a method 100 of hanging objects on a hanger is described herein that includes securing 102 an elongate anchor portion of a hanger to an upstanding post so that a support portion of the hanger extends generally outwardly and transverse from the anchor portion; and hanging 104 an object on a hanging platform portion of the support portion that extends laterally outwardly from adjacent portions of the support portion such that a width of the hanging platform portion is larger than a width of the upstanding post.

By some approaches, the method 100 can further include retaining the object on the support portion with a stop portion disposed at a distal end thereof.

By several approaches, hanging the object on the hanging platform portion can include hanging the object in a laterally extending depression in an upper surface of the hanging platform portion, where the depression configured to restrict movement of the object.

By some approaches, securing the elongate anchor portion of the hanger to the upstanding post can include installing one or more fasteners through openings in the elongate anchor portion into the upstanding post. By other approaches, securing the elongate anchor portion of the hanger to the upstanding post can include inserting rearwardly projecting protrusions of the elongate anchor portion into openings or recesses of the upstanding post. By further approaches, inserting the rearwardly projecting protrusions into the openings or recesses of the upstanding post can include inserting the rearwardly projecting protrusions into openings or recesses of a bracket mounted to the upstanding post.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method of hanging objects on a hanger, the method comprising:
   providing a hanger comprising:
      an elongate anchor portion including a plurality of rearwardly projection protrusions spaced longitudinally along a rear surface of the elongate anchor portion;
      a support portion extending generally outwardly and transversely from the elongate anchor portion at a first end thereof to a distal end thereof;
      a hanging platform portion of the support portion between the first and distal ends and extending laterally outwardly, a width of the hanging platform portion being greater than a width of the elongate anchor portion; and
      an elongate mounting bracket including a front surface with a plurality of recesses spaced longitudinally therealong and at least one hole extending through the elongate mounting bracket;
   mounting the bracket to an upstanding post such that the bracket extends longitudinally along the upstanding post;
   inserting the rearwardly projecting protrusions into recesses of the bracket mounted to the upstanding post so that a support portion of the hanger extends generally outwardly and transverse from the anchor portion;
   hanging an object on a hanging platform portion of the support portion;
   wherein hanging the object on the hanging platform portion comprises hanging the object in a laterally extending depression in an upper surface of the hanging platform portion, the depression configured to restrict movement of the object.

2. The method of claim 1, further comprising retaining the object on the support portion with a stop portion disposed at a distal end thereof.

3. A method of hanging objects on a hanger, the method comprising:
   providing a hanger comprising:
      an elongate anchor portion including a plurality of rearwardly projection protrusions spaced longitudinally along a rear surface of the elongate anchor portion;
      a support portion extending generally outwardly and transversely from the elongate anchor portion at a first end thereof to a distal end thereof;
      a hanging platform portion of the support portion between the first and distal ends and extending laterally outwardly, a width of the hanging platform portion being greater than a width of the elongate anchor portion; and
      an elongate mounting bracket including a front surface with a plurality of recesses spaced longitudinally therealong and at least one hole extending through the elongate mounting bracket;
   mounting the bracket to an upstanding post such that the bracket extends longitudinally along the upstanding post;
   inserting the rearwardly projecting protrusions into recesses of the bracket mounted to the upstanding post so that a support portion of the hanger extends generally outwardly and transverse from the anchor portion;
   hanging an object on a hanging platform portion of the support portion; and
   securing the elongate anchor portion of the hanger to the upstanding post so that the anchor portion extends vertically above the support portion.

4. The method of claim 3, further comprising retaining the object on the support portion with a stop portion disposed at a distal end thereof.

* * * * *